(12) United States Patent
Chen

(10) Patent No.: US 9,112,352 B2
(45) Date of Patent: Aug. 18, 2015

(54) CONDITION RESPONSIVE CIRCUIT PROTECTION APPARATUS WHICH CAN ENTER AN ENERGY SAVING MODE

(71) Applicants: Shu-Ling Chen, Taipei (TW); Chun-Fu Lin, Taipei (TW)

(72) Inventor: Shu-Ling Chen, Taipei (TW)

(73) Assignees: Shu-Ling Chen, Taipei (TW); Chun-Fu Lin, Taipei (TW)

( * ) Notice: Subject to any disclaimer, the term of this patent is extended or adjusted under 35 U.S.C. 154(b) by 204 days.

(21) Appl. No.: 13/757,766

(22) Filed: Feb. 2, 2013

(65) Prior Publication Data

US 2014/0218200 A1 Aug. 7, 2014

(51) Int. Cl.
*G08B 21/00* (2006.01)
*H02H 3/087* (2006.01)
*H02H 3/04* (2006.01)

(52) U.S. Cl.
CPC . *H02H 3/087* (2013.01); *H02H 3/04* (2013.01)

(58) Field of Classification Search
CPC .................................. H02H 3/04; H02H 3/87

USPC .......... 340/635, 644, 649–664; 361/1, 88–102
See application file for complete search history.

(56) References Cited

U.S. PATENT DOCUMENTS

2004/0218325 A1\* 11/2004 Shih .............................. 361/93.1

\* cited by examiner

*Primary Examiner* — Jeffery Hofsass
(74) *Attorney, Agent, or Firm* — Li & Cai Intellectual Property (USA) Office

(57) ABSTRACT

A circuit protection apparatus is disclosed. A peripheral interface includes a first power node and a second power node. The circuit protection apparatus includes an auxiliary power supply circuit, a power converter, a first switch, a second switch, a power switch circuit, a warning circuit, and a controller. When a load is plugged to the peripheral interface, the first switch turns on, and the controller is enabled and outputs a control signal, so as to drive the power converter to output power. When the current between input terminal and output terminal of the power switch circuit is larger than a predetermined current, the controller receives the error flag logical voltage outputted by the power switch circuit, cuts off the current between input terminal and output terminal of the power switch circuit, and stops the operations of the power converter.

16 Claims, 9 Drawing Sheets

CONDITION RESPONSIVE CIRCUIT PROTECTION APPARATUS WHICH CAN ENTER AN ENERGY SAVING MODE

BACKGROUND OF THE INVENTION

1. Field of the Invention

The present invention relates to a circuit protection apparatus for detecting whether a peripheral component is plugged, damaged, or short-circuited; in particular, to a circuit protection apparatus which is able to automatically turn on or enter into a power saving mode, and is able to totally isolate the output power and the load automatically.

2. Description of Related Art

Because of the lightening and thinning of electronic devices, users are used to be accompanied with the electronic devices. The common electronic devices, such as mobile phones, personal digital assistances (PDA), notebook computers, tablet computers, digital cameras, and digital camcorders, etc., are widely used by people, and become an indispensable part in the modern information life.

FIG. 1a shows a circuit block diagram of a short-circuit protection circuit used in universal serial bus (USB) port according to the conventional techniques. Generally, an output short-circuit protection is mainly based on the short-circuit protection by increasing or lowering the voltage within the integrated circuit (IC), and in the short-circuit protection of this kind of IC the time length of the short-circuit protection is usually set by connecting externally a RC circuit including resistors and capacitors. For example, when a short-circuit occurs, the time length when the power switch 103 stops outputting voltages and currents lies between a few tens of microseconds to a few seconds. When the time at which the power switch 103 stops outputting both the voltages and currents is reached, the power converter 102 then will continuously output voltages and currents. If the short-circuit still exists, the short-circuit protection mentioned above is then executed again. Therefore, the output is opened and then closed for several times before the short-circuit problem is solved. This is due to the fact that the objective of the short-circuit protection of this kind of IC is for protecting the IC itself, and serves as the last protection stage when other external functions for protecting the circuits are inactivated. In other words, the short-circuit protection of this kind of IC cannot work when the product is short-circuited. Unfortunately, many electronic products are designed in this manner, which makes the safety of the short-circuit protection be seriously not enough, and is very easy to damage the external instruments or the inner circuits.

In addition, this kind of IC does not have a current limitation protection, that is, when the external device generates abnormally large current because of current spike, aging, or interferences and the current is not large enough to cause a short circuit, it is still be deemed that the large current is normal and continuously outputted in this kind of IC, this situation is very easy to cause damages to the external devices.

Moreover, there are also many electronic devices, in which the circuits have no designs of short-circuit or current limitation protections, and they usually rely on the protection IC used in batteries to serve as the last protection stage of the products. However, this kind of IC still has a small chances to operate wrongly or even not operate, that is, the short-circuit protection has a small chance to be inactivated. In addition, these kinds of designs are also easy to cause damages to the electronic circuits and the load instruments. The mentioned circuits do not have the capability of detecting whether the external short-circuit or over-current situation is totally eliminated or not, and also cannot warn the users for immediately solving the situation when the short-circuit or over-current occurs. Therefore, this disclosure provides practical solutions for solving the aforementioned problems.

In addition, the modern 3C mobile products, such as a mobile power (or called as a power bank), a charger, or a voltage transformer etc., emphasize strongly the functionalities of intelligence and power saving, some products with powerful functions may include the functionalities of automatically turn-on or turn-off. FIG. 1b shows a circuit block diagram of a current limiting protection circuit of a USB port according to the conventional techniques. Please refer to FIG. 1b, the circuit includes a USB port 104, an amplifier 105, a controller 106, and a power converter 107. When the USB port 104 is connected with the peripheral component, the amplifier 105 outputs an enable signal EN. When the controller 106 receives the enable signal EN, the controller 106 leaves the power saving mode, which makes the power converter 107 to output fully electric energies. However, such detection and enabling circuits are usually accompanied with a few power consumption, for example, even out of work, the amplifier 105 still has a basic power consumption. Those power consumptions usually may influence the usage time of the battery, and is easy to generate wrong operations.

SUMMARY OF THE INVENTION

The disclosure discloses a circuit protection apparatus, which can automatically enter into a power saving mode or a power supply mode, and can automatically isolate totally the circuits between the output power and load when the circuit protection apparatus is short-circuited or the current exceeds a predetermined current. Then a warning component is actuated for warning the users.

The disclosure discloses a power turn-on device, which uses a loop resistor without power consumption at normal time, the positive node (anode) of the terminals for outputting the power, and other two detection and turn-on switch components (such as a MOSFET or a bipolar transistor) for forming a cut-off loop. When the load is connected with the output terminal, a close loop is formed for turning on or triggering the inner control circuits or other circuits, so as to achieve the objectives of the disclosure.

For achieving the aforementioned and other objectives, the disclosure provides a circuit protection apparatus, for executing short-circuit protection to a peripheral interface. The peripheral interface includes a first power node and a second power node. The circuit protection apparatus includes a power converter, a power switch circuit, a warning circuit, and a controller.

The power converter includes an input terminal and an output terminal. The input terminal of the power converter receives a control signal, and adjusts the voltage of the output terminal of the power converter according to the control signal. The power switch circuit includes an input terminal, an output terminal, a warning terminal, and an enable terminal. The input terminal of the power switch circuit is coupled to the output terminal of the power converter, and the output terminal of the power switch circuit is coupled to the first power node. The warning circuit includes a first terminal and a second terminal. The second terminal of the warning circuit is coupled to a common voltage. The controller includes a first control terminal, at least one warning control terminal, an enable control terminal, and an abnormity warning terminal. The first control terminal of the controller is coupled to the input terminal of the power converter, the warning control terminal of the controller is coupled to the first terminal of the warning circuit, the enable control terminal of the controller is coupled to the enable terminal of the power switch circuit, and the abnormity warning terminal of the controller is coupled to the warning terminal of the power switch circuit.

When a load is plugged to the peripheral interface and makes the first power node electrically connected with the second power node through the load, the controller is enabled and controls the power converter for outputting a power voltage, and the enable control terminal of the controller outputs an enable signal. When the enable terminal of the power switch circuit receives the enable signal outputted by the controller, the input terminal and the output terminal of the power switch circuit turn on.

When the load is too large and makes the first power node and the second power node short-circuited and thus the currents of the output terminal and the input terminal of the power switch circuit are larger than a predetermined current, then the warning terminal of the power switch circuit outputs an error flag logical voltage. When the abnormity warning terminal of the controller receives the error flag logical voltage, the controller then turns off the power converter by using the first control terminal thereof, and turns off the power switch circuit by using the enable control terminal thereof, so that the input terminal and the output terminal of the power switch circuit are cut off. Moreover, the controller warns the users by conducting the warning circuit through the warning control terminal.

For achieving the aforementioned and other objectives, the disclosure further provides a circuit protection method for executing short-circuit protection to a peripheral interface. The peripheral interface includes a first power node and a second power node. The short-circuit warning protection method includes: providing a power switch circuit between the first power node and a power converter, detecting the current magnitude between the input terminal and the output terminal of the power switch circuit; when the current between the input terminal and the output terminal of the power switch circuit is larger than a predetermined current, the power switch circuit outputs an error flag logical voltage; when the controller receives the error flag logical voltage, the current between the input terminal and the output terminal of the power switch circuit is cut off; stopping the operations of the power converter; and the warning component is actuated for noticing the users.

In the disclosure the controller is enabled to output a control signal when the first switch is turned on, and the controller controls the second switch to turn on and uses the detection terminal for continuously detecting the voltage of the second power node. In addition, in the disclosure a switch circuit is added between the power converter and the power terminal of the peripheral interface, wherein the switch circuit has the functionalities for detecting the current or the voltage or both. When the current or the voltage is abnormal, the switch circuit may output a warning signal to notice a microprocessor, and the microprocessor may turn off the power converter immediately. Then the microprocessor can immediately conduct the warning components connected thereto, for making the users know that the plugged peripheral component is abnormal. When the situation is solved, the circuit protection apparatus in the disclosure can further enter into the power saving mode and the usage lifetime of the products is extended.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

The following descriptions make use of figures for describing the embodiments of the disclosure, and same reference numbers in the figures are used for representing similar components.

First Embodiment

Figure 1A:
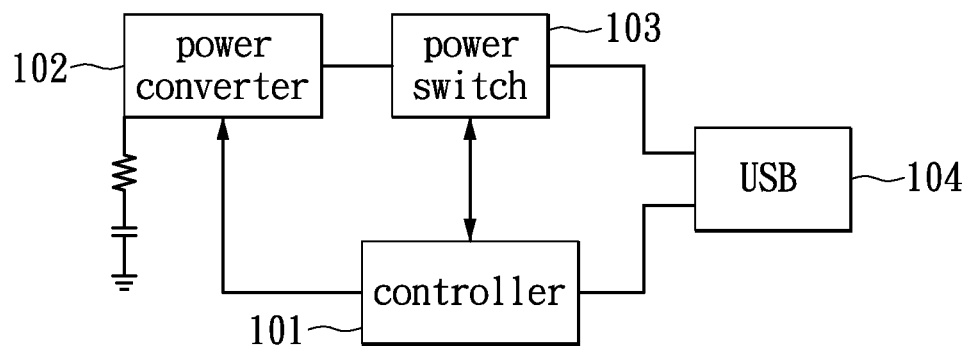
FIG. 1a shows a circuit block diagram of a short protection circuit applied to the USB port according to the conventional techniques.
Figure 1B:
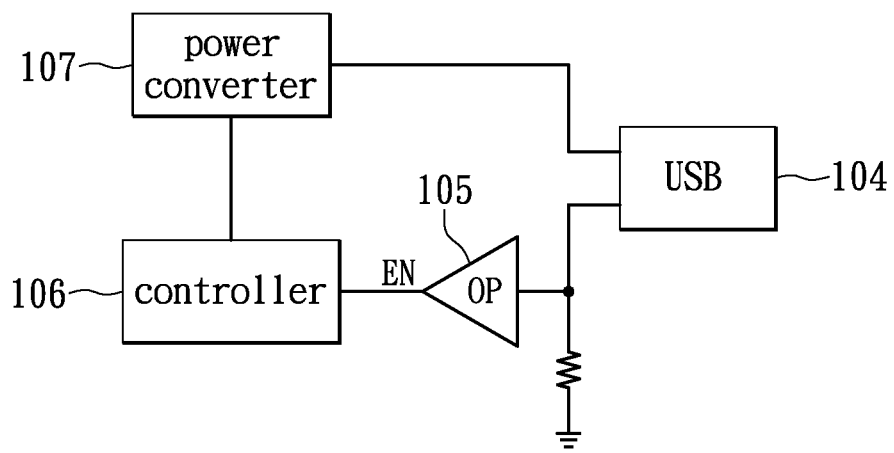
FIG. 1b shows a circuit block diagram of a current limiting protection circuit applied to the USB port according to the conventional techniques.
Figure 2:
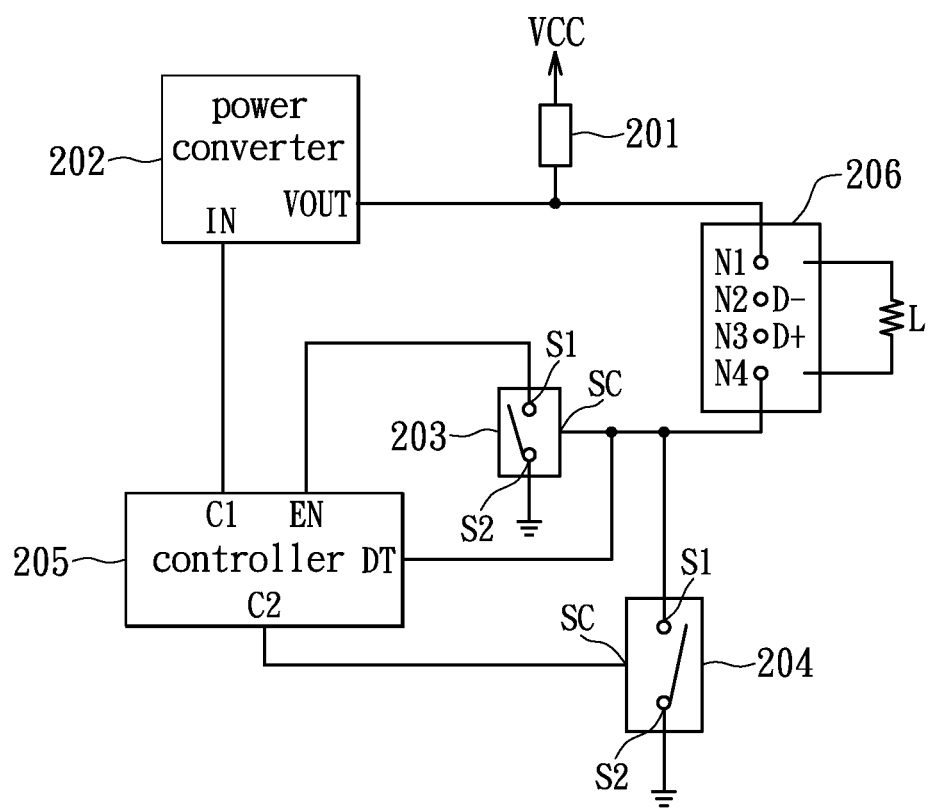
FIG. 2 shows a circuit block diagram of a circuit protection apparatus according to a first embodiment of the disclosure.

FIG. 2 shows a circuit block diagram of a circuit protection apparatus according to a first embodiment of the disclosure. Please refer to FIG. 2, the circuit protection apparatus includes an auxiliary power supply circuit 201, a power converter 202, a first switch 203, a second switch 204, and a controller 205. The circuit protection apparatus provided by the disclosure is used for controlling a peripheral interface 206. The peripheral interface 206 may be a DC jack, an earphone socket, a USB port, a mini USB, a micro USB, a military connection port, an industrial connection port, a medical connection port, a cosmetic connection port, or other connection ports. The embodiment does not limit the implementation type of the peripheral interface 206.

For making the one skilled in the art know the spirits of the disclosure, the peripheral interface 206 is, for example, a USB port. The peripheral interface 206 includes a first power node N1, a D− node N2, a D+ node N3, and a second power node N4. The auxiliary power supply circuit 201 includes a first terminal and a second terminal. The first terminal of the auxiliary power supply circuit 201 is coupled to a power voltage VCC, and the second terminal of the auxiliary power supply circuit 201 is coupled to the first power node N1.

The power converter 202 includes an input terminal IN and an output terminal VOUT. The output terminal VOUT is coupled to the first power node N1. The input terminal IN receives a control signal, and adjusts the voltage of the output terminal VOUT of the power converter 202.

The first switch 203 includes a first terminal S1, a second terminal S2, and a control terminal SC. The second terminal S2 of the first switch 203 is coupled to a common voltage, and the control terminal SC of the first switch 203 is coupled to the second power node N4. For the convenience of descriptions, the common voltage in this embodiment is, for example, a ground.

The second switch 204 includes a first terminal S1, a second terminal S2, and a control terminal SC. The second terminal S2 of the second switch 204 is coupled to the common voltage, and the first terminal S1 of the second switch 204 is coupled to the second power node N4. The controller 205 includes a first control terminal C1, a second control terminal C2, an enable terminal EN, and a detection terminal DT. The first terminal C1 of the controller 205 is coupled to the input terminal IN of the power converter 202, the second terminal C2 of the controller 205 is coupled to the control terminal SC of the second switch 204, the enable terminal EN of the controller 205 is coupled to the first terminal S1 of the first switch 203, and the detection terminal DT of the controller 205 is coupled to the second power node N4.

We can see from the coupling relations in FIG. 2 that when the peripheral interface 206 is not plugged with any load, the first power node N1 and the second power node N4 are cut off and make the path between the first terminal S1 and the second terminal S2 of the first switch 203 be opened, and the controller 205 is not enabled. At this moment, the controller 205 is under sleep or power saving mode and does not consume power, and does not turn on the first terminal S1 and the second terminal S2 of the second switch 204. Thus, when there is no load plugged to the peripheral interface 206, the circuit in FIG. 2 is in a cut-off loop status, and consumes almost no electric power.

When a load L is plugged to the peripheral interface 206, the first power node N1 and the second power node N4 are electrically connected with each other through the load L. Generally, the equivalent resistance of the load L is about 2.5 to 10 ohms and lets the power voltage VCC coupled by the auxiliary power supply circuit 201 be provided to the control terminal SC of the first switch 203 through the load L.

At this moment, the first terminal S1 and the second terminal S2 of the first switch 203 are conductive, and the enable terminal EN of the controller 205 receives the common voltage. After the enable terminal of the controller 205 receives the common voltage, the controller 205 is enabled, and the first control terminal C1 of the controller 205 outputs a control signal for driving the output terminal VOUT of the power converter 202 to output power. Moreover, the controller 205 controls the second switch 204 to turn on by using the second control terminal C2, and continuously detects the current or voltage of the second power node N4 by using the detection terminal DT. When the controller 205 detects that the current or voltage of the second power node N4 is lower than a predetermined value, both of the first control terminal C1 and the second control terminal C2 of the controller 205 stop outputting the control signals, and the controller 205 enters into the power saving mode. Practically, the predetermined voltage is such as 0.5V, when the voltage attains the predetermined voltage of 0.5V, the controller 205 then controls the power converter 202 to provide power. When the fluctuation of the voltage is smaller than the predetermined voltage of 0.5V, the controller 205 controls the power converter 202 to stop providing power. The present embodiment does not limit the value of the predetermined voltage.

In other words, when the load L is removed from the peripheral interface 206, the first power node N1 and the second power node N4 are back to the cut-off status, and the auxiliary power supply circuit 201 cannot provide the power voltage VCC to the first switch 203 through the load L, thus the first switch 203 turns off. When the detection terminal DT of the controller 205 detects that the current or voltage is lower than the predetermined value, the controller 205 than enters into the power saving mode, the power converter 202 is controlled to stop providing power, and the second switch 204 is also controlled to be turned off, thus the circuits recover to the status which does not consume power.

We can know from the above embodiment that the first switch 203 and the second switch 204 or some components will not consume electric power in a normal situation. When the load L has not been plugged, the circuit loop is not formed, thus there is no loop current or other current. Therefore, the above embodiment of the disclosure can reduce the power consumptions under standby situation, and lengthen the usage lifetime of the products.

In the above embodiment, the power converter 202 is, for example, a switching power converter including buck, boost, or buck-boost types. Thus, the disclosure does not limit the type of the power converter. In addition, the first switch 203 and the second switch 204 can be implemented by, for example, bipolar transistors or MOSFETs.

Second Embodiment

Figure 3:
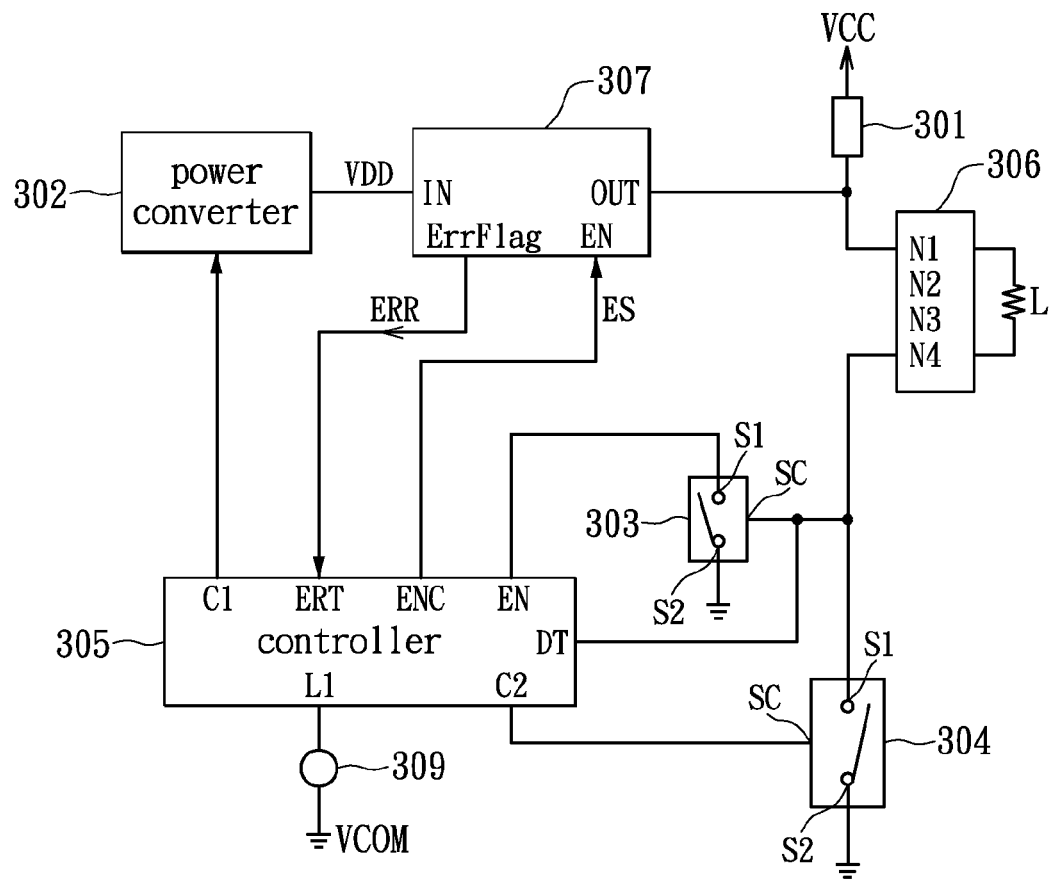
FIG. 3 shows a circuit block diagram of a circuit protection apparatus according to a second embodiment of the disclosure.

FIG. 3 shows a circuit block diagram of a circuit protection apparatus according to a second embodiment of the disclosure. Please refer to FIG. 3, the circuit protection apparatus in this embodiment is applied to a peripheral interface 306, such as a USB port or an IEEE 1394 etc. In this embodiment, the peripheral interface 306 is, for example, a USB connection port interface which has four nodes including a first power node N1, a first data node N2, a second data node N3, and a second power node N4. The circuit protection apparatus includes a power converter 302, a power switch circuit 307, a warning circuit 309, and a controller 305.

The power converter 302 includes an input terminal and an output terminal. The input terminal of the power converter 302 receives a control signal, and adjusts the voltage of the output terminal of the power converter 302 according to the control signal. Generally, the power converter 302 can be a switching power supply or a linear voltage regulator. In addition, the switching power supply can be divided into buck, boost, or flyback types, etc., according to the applications. The present embodiment does not limit the type of the power converter. As an example, if the power converter 302 is a switching power supply, the control signal may be a pulse width modulation (PWM) signal PWM.

The power switch circuit 307 includes an input terminal IN, an output terminal OUT, a warning terminal ErrFlag, and an enable terminal EN. The input terminal IN of the power switch circuit 307 is coupled to the output terminal of the power converter 302, and the output terminal OUT of the power switch circuit 307 is coupled to the first power node N1. The warning circuit 309 includes a first terminal and a second terminal. The second terminal of the warning circuit 309 is coupled to a common voltage VCOM. The controller 305 includes a first control terminal C1, at least one warning control terminal L1, an enable control terminal ENC, and an abnormity warning terminal ERT. The first control terminal C1 of the controller 305 is coupled to the input terminal of the power converter 302, the warning control terminal L1 of the controller 305 is coupled to the first terminal of the warning circuit 309, the enable control terminal ENC of the controller 305 is coupled to the enable terminal EN of the power switch circuit 307, and the abnormity warning terminal ERT of the controller 305 is coupled to the warning terminal ErrFlag of the power switch circuit 307.

Supposing that the user takes a peripheral component as the load L, such as the USB disk or the USB mouse, the peripheral component is plugged to the peripheral interface 306 and causes the first power node N1 and the second power node N4 to be electrically connected to each other through the load L. The controller 305 controls the power converter 302 to output a power voltage VCC, and the enable control terminal ENC of the controller 305 outputs an enable signal ES. When the enable terminal EN of the power switch circuit 307 receives the enable signal ES, the input terminal IN and the output terminal OUT of the power switch circuit 307 are conductive. At this moment, the peripheral component can receive the power voltage VCC and stars to work.

When the load L is too large and makes the first power node N1 and the second power node N4 short-circuited, and further makes the currents of the input terminal IN and the output terminal OUT of the power switch circuit 307 larger than a predetermined current, then the warning terminal ErrFlag of the power switch circuit 307 outputs an error flag logical voltage ERR (such as a logical high voltage or a logical low voltage). When the abnormity warning terminal ERT of the controller 305 receives the error flag logical voltage ERR, the controller 305 turns off the power converter 302 by using the first control terminal C1, and turns off the power switch circuit 307 by using the enable control terminal ENC, so that the input terminal IN and the output terminal OUT of the power switch circuit 307 are cut off. In addition, the controller 305 turns on the warning circuit 309 by using the warning control terminal L1 so as to notice the users. When the user sees the warning light or warning sounds emitted by the warning circuit 309, the user can know that the plugged peripheral component may have some problems which cause a short circuit situation, thus the user may emergently remove the peripheral component for avoiding more damages.

It is worth noting that there is only one peripheral interface 306 coupled with one load L for illustration in this embodiment, however, in other embodiments, the disclosure can be used in a plurality of peripheral interfaces coupled to several loads. When one of the loads causes a short circuit situation or its current exceeds the predetermined current, the circuit between the output power source and one of the loads in this disclosure can also be automatically and totally isolated, and the warning circuit is actuated for warning the users, while the original functions between the output power source and the rest of the loads are still be maintained. Similarly, if some of the loads cause short circuit situations or their currents exceed the predetermined current, the circuits between the output power source and some of the loads in this disclosure can also be automatically and totally isolated, and the warning circuit is actuated for warning the users, while the original functions between the output power source and the rest of the loads are still be maintained. The present embodiment does not limit the type of the circuit protection apparatus.

Third Embodiment

Figure 4:
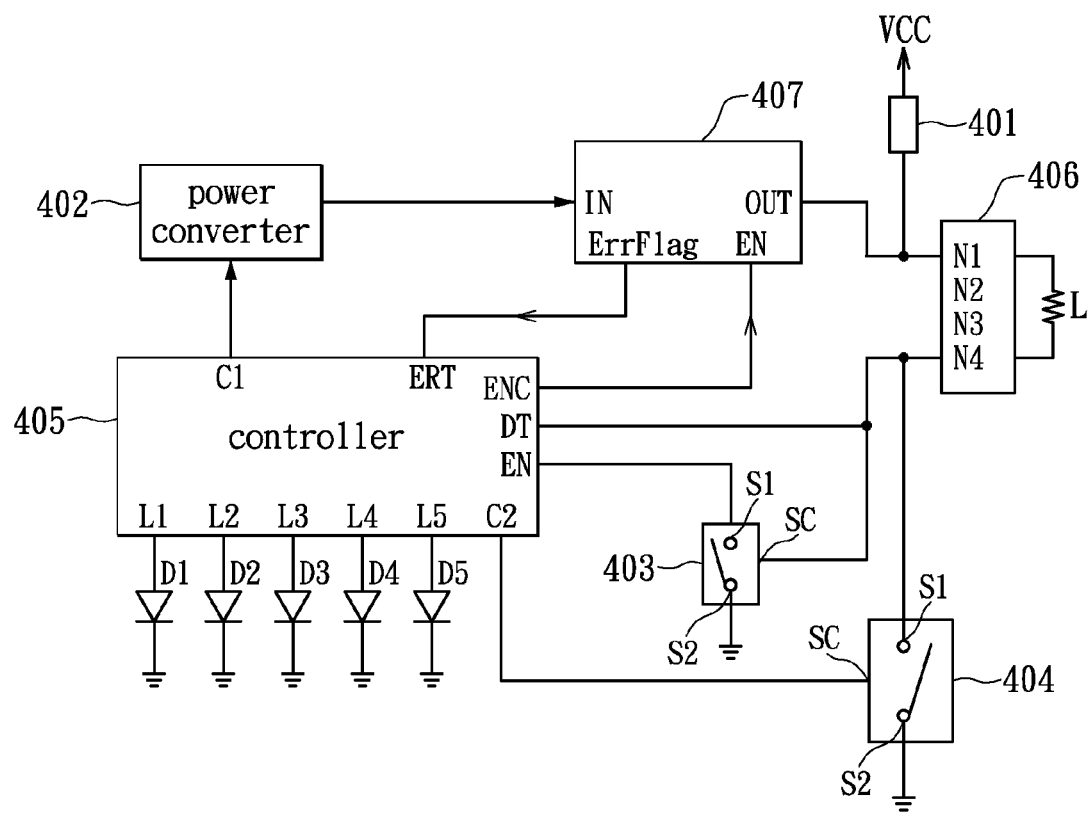
FIG. 4 shows a circuit block diagram of a circuit protection apparatus according to a third embodiment of the disclosure.

Another circuit protection apparatus is provided as shown in FIG. 4. FIG. 4 shows a circuit block diagram of a circuit protection apparatus according to a third embodiment of the disclosure. Please refer to FIG. 4, similarly, the circuit protection apparatus in this embodiment is applied to a peripheral interface 406, such as a USB port interface or an IEEE 1394, etc. Supposing that the peripheral interface 406 here is a USB port interface which has four nodes, including a first power node N1, a first data node N2, a second data node N3, and a second power node N4. In addition to a power converter 402, a power switch circuit 407, five light emitting diodes (LEDs) D1 to D5, and a controller 405, the circuit protection apparatus further includes a first switch 403, a second switch 404, and an auxiliary power supply circuit 401. For the explanation convenience, the warning circuit in this embodiment is illustrated by including some LEDs. In other embodiments, the warning circuit can be, for example, a speaker including a buzzer or a loudspeaker, and the type of the warning circuit is not limited in this embodiment.

The first switch 403 and the second switch 404 respectively include a first terminal S1, a second terminal S2, and a control terminal SC. In addition, in the third embodiment, the controller 405 further includes a second control terminal C2, an enable terminal EN, and a detection terminal DT. The second terminal C2 of the controller 405 is coupled to the control terminal SC of the second switch 404, the enable terminal EN of the controller 405 is coupled to the first terminal S1 of the first switch 403, and the detection terminal DT of the controller 405 is coupled to the second power node N4.

We can see from the coupling relations in FIG. 4 that when there is no load being plugged to the peripheral interface 406, the first power node N1 and the second power node N4 are cut off, so that the first terminal S1 and the second terminal S2 of the first switch 403 are opened, and the controller 405 is not enabled. At this moment, the controller 405 is under sleep or power saving mode and does not consume power, thus the controller 405 does not turn on the first terminal S1 and the second terminal S2 of the second switch 404. Therefore, when there is no load being plugged to the peripheral interface 406, the circuits in FIG. 4 are under a cut-off loop status, and consume almost no electric power.

Supposing that the user take a peripheral component as the load L, such as a USB disk or a USB mouse, the peripheral component is plugged to the peripheral interface 406 and makes the first power node N1 and the second power node N4 be electrically connected through the load L. Generally, the equivalent resistance of the load L is about 2.5 to 10 ohms, so that the power voltage VCC coupled by the auxiliary power supply circuit 401 can be provided to the control terminal SC of the first switch 403 through the load L. At this moment, the first terminal S1 and the second terminal S2 of the first switch 403 are conductive, and the enable terminal EN of the controller 405 receives the common voltage. After the enable terminal EN of the controller 405 receives the common voltage, the controller 405 is enabled, and the first control terminal C1 of the controller 405 outputs the control signal for driving the output terminal of the power converter 402 so as to output power. After that, the controller 405 controls the second switch 404 to turn on by using the second control terminal C2, so as to form a circuit loop. Then, the controller 405 continuously detects the current or voltage of the second power node N4 by using the detection terminal DT.

When the load L is short-circuited or has too large current, the power switch circuit 407 generates an error flag logical voltage ERR to the controller 405. When the abnormity warning terminal ERT of the controller 405 receives the error flag logical voltage ERR, the controller 405 then turns off the power switch circuit 407 by using the enable control terminal ENC, and simultaneously turns off the second switch 404 by using the second control terminal C2, so as to cut off the circuit loop between the first power node N1 and the second power node N4 of the peripheral interface 406, and the controller 405 makes one or more LEDs (D1 to D5) to flicker simultaneously for warning the users. Generally, supposing that a mobile device has the peripheral interface 406 as an example, the mobile device usually has several light emitting circuits (usually LEDs) which are used for displaying the present power status or capacity of the batteries. In this embodiment, the applicant may use the light emitting circuits as the warning circuit, for warning the users.

When the users see the abnormal lights, they may remove the peripheral component immediately. At this moment, the controller 405 detects that the current or voltage of the second power node N4 is lower than a predetermined value, the first control terminal C1 of the controller 405 then stops outputting the control signal, and the controller 405 controls the power converter 402 to stop outputting the power and enters into a power saving mode.

In other words, when the load L is removed from the peripheral interface 406, the first power node N1 and the second power node N4 return to a cut-off status, the current or voltage outputted by the second power node N4 changes to zero, and the auxiliary power supply circuit 401 cannot provide the power voltage VCC to the first switch 403 through the load, then the first switch 403 turns off. When the detection terminal DT of the controller 405 detects that the current or voltage is lower than the predetermined value, the controller 405 enters into the power saving mode and controls the power converter 402 to stop outputting the power, and also controls the second switch 404 to turn off, so that the circuits recover to the status in which no electric power is consumed.

It's worth mentioning that the controller 405 controls the second switch 404 to turn on so as to form a circuit loop, thereby an enough voltage is provided to the control terminal SC of the first switch 403. Thus, the controller 405 may continuously turn on the power switch circuit 407 and the second switch 404, so that the power converter 402 can provide a power voltage to the load L. When the load L is short-circuited and causes an over-current, the controller 405 controls the power switch circuit 407 and the second switch 404 to turn off and turns on the warning circuit, thereby the efficacies of short-circuit warning protection is achieved.

Fourth Embodiment

Figure 5:
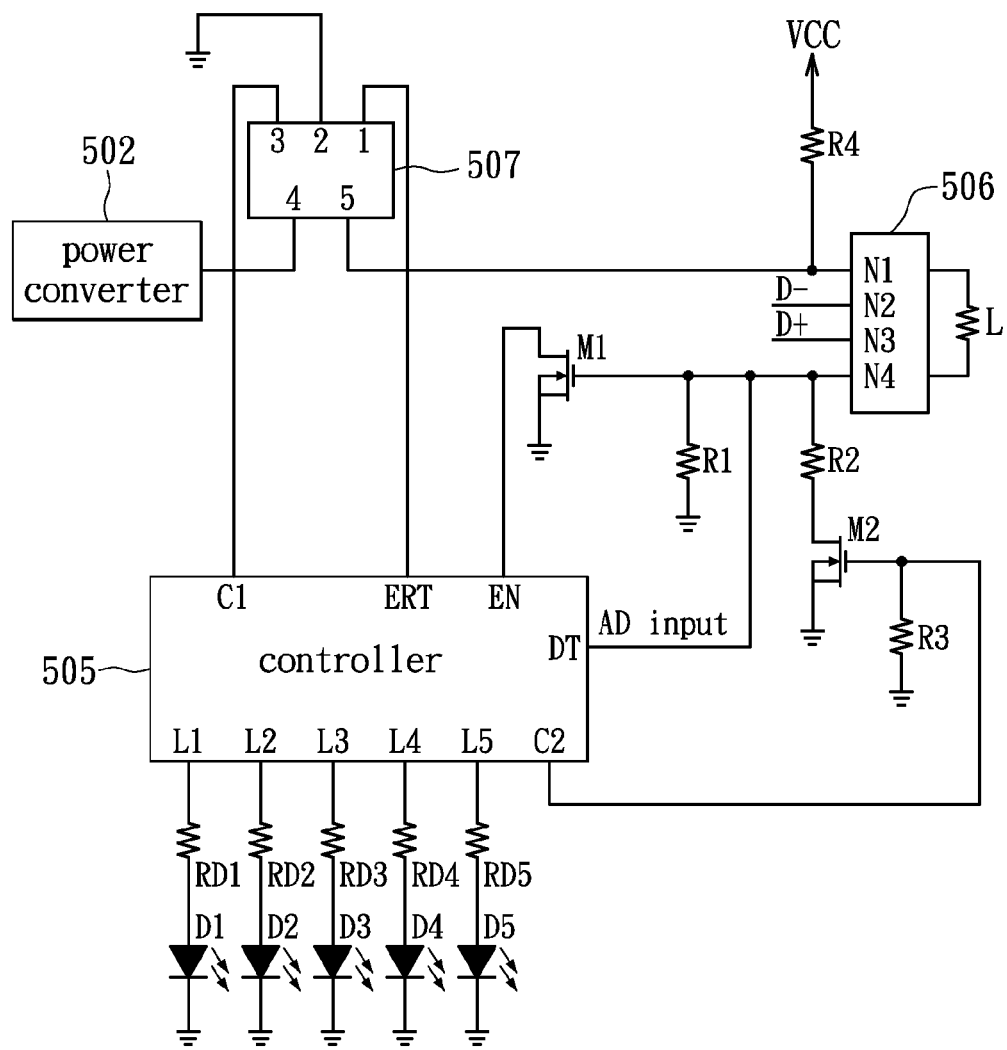
FIG. 5 shows a circuit block diagram of a circuit protection apparatus according to a fourth embodiment of the disclosure.

FIG. 5 shows a circuit block diagram of a circuit protection apparatus according to a fourth embodiment of the disclosure. Please refer to FIG. 5, in the fourth embodiment, the first switch and the second switch are implemented with MOSFETs. The circuit protection apparatus includes a first impedance component R1, a second impedance component R2, a third impedance component R3, a fourth impedance component R4, a power converter 502, a first MOSFET M1, a second MOSFET M2, a power switch circuit 507, and a controller 505.

The circuit protection apparatus provided in this embodiment is used for controlling a peripheral interface 506. Similarly, the peripheral interface 506 in this embodiment is, for example, a USB port, thus it is not repeatedly described. In addition, the operations of the controller 505, the power switch circuit 507, and the power converter 502 in this embodiment are similar to those in the first embodiment, thus they are not repeatedly described.

The first impedance component R1 is implemented by a resistor which includes a first terminal and a second terminal. The first terminal of the resistor is coupled to the second power node N4, and the second terminal of the resistor is coupled to the common voltage.

The second impedance component R2 is implemented by a resistor including a first terminal and a second terminal. The first terminal of the resistor is coupled to the second power node N4, and the second terminal of the resistor is coupled to the first node of the second MOSFET M2.

The third impedance component R3 is implemented by a resistor including a first terminal and a second terminal. The first terminal of the resistor is coupled to the gate node of the second MOSFET M2, and the second terminal of the resistor is coupled to the common voltage.

The auxiliary power supply circuit in this embodiment is implemented by, for example, the fourth impedance component R4. The fourth impedance component R4 is a resistor and includes a first terminal and a second terminal. The first terminal of the resistor is coupled to a power voltage VCC, and the second terminal of the resistor is coupled to the first power node N1.

The first MOSFET M1 includes a gate node, a first node, and a second node. The gate node of the first MOSFET M1 is coupled to the second power node N4, the first node of the first MOSFET M1 is coupled to the enable terminal EN of the controller 505, and the second node of the first MOSFET M1 is coupled to the common voltage.

The second MOSFET M2 includes a gate node, a first node, and a second node. The gate node of the second MOSFET M2 is coupled to the second control terminal C2 of the controller 505, the first node of the second MOSFET M2 is coupled to the second terminal of the second impedance component R2, and the second node of the second MOSFET M2 is coupled to the common voltage.

We can see from the fourth and third embodiments that in the third embodiment the first MOSFET M1 and the second MOSFET M2 are used for implementing the first switch 403 and the second switch 404. In addition, because the MOSFETs M1 and M2 need bias voltages, the first impedance component R1, the second impedance component R2, the third impedance component R3, and the fourth impedance component R4 are added additionally in this embodiment.

Similarly, when the user plugs the peripheral component into the peripheral interface 506, the power voltage VCC may let the circuit between the first node and the second node of the first MOSFET M1 be conductive by means of the voltage divided by the fourth impedance component R4 and the first impedance component R1. The enable terminal EN of the controller 505 receives the common voltage and thus changes from the power saving mode to the turn-on mode. After the controller 505 enters into the turn-on mode, it may control the power converter 502 to begin to output the power voltage VCC. In addition, the controller 505 may control the second MOSFET M2 to turn on. Moreover, the detection terminal DT of the controller 505 is an input terminal of an analog to digital conversion, and the conversion is used for changing the voltage of the second power node N4 into a digital value so that it is easier for the controller 505 to make determinations. Generally, the voltage of the second power node N4 may be deemed as:

$$VN4 = VCC \times R2 \div (R2+RL)$$

Here RL represents the impedance of the load L. The above formula is obtained by ignoring the inner resistance of the second MOSFET M2. Because the impedance of RL is about 2.5 to 10 ohms, the USB peripheral components need about 5V±5% for operation. For making the USB work normally, the value of the second impedance component R2 cannot be selected to be too large. Here it is supposed that the voltage divided by the second impedance component R2 and the impedance RL of the load L is about 0.1V, and the threshold is set to 0.05V.

After the user uses the peripheral component, the load L is removed. At this moment, because the second MOSFET M2 is still conductive, the voltage of the second power node N4 may discharge rapidly, thus the original 0.1V of the second power node N4 starts to decrease. When the voltage of the second power node N4 decreases to 0.05V, the controller 505 then enters into the power saving mode. At this moment, the controller 505 controls the power converter 502 to stop outputting the power voltage VCC, controls the second MOSFET M2 to turn off, and the controller 505 also controls itself to enter into the power saving mode.

When the peripheral component is short-circuited, the instantaneous current between the input terminal IN and the output terminal OUT of the power switch circuit 507 will become too large, at this moment, the power switch circuit 507 outputs the error flag logical voltage ERR to the controller 505. When the abnormity warning terminal ERT of the controller 505 receives the error flag logical voltage ERR, the controller 505 turns off the power switch circuit 507 by using the enable control terminal ENC, and simultaneously controls the second MOSFET M2 to turn off by using the second control terminal C2, so as to cut off the circuit loop between the first power node N1 and the second power node N4 of the peripheral interface 506. Moreover, the controller 505 makes one or more LEDs D1 to D5 to flicker simultaneously for warning the users.

Fifth Embodiment

Figure 6:
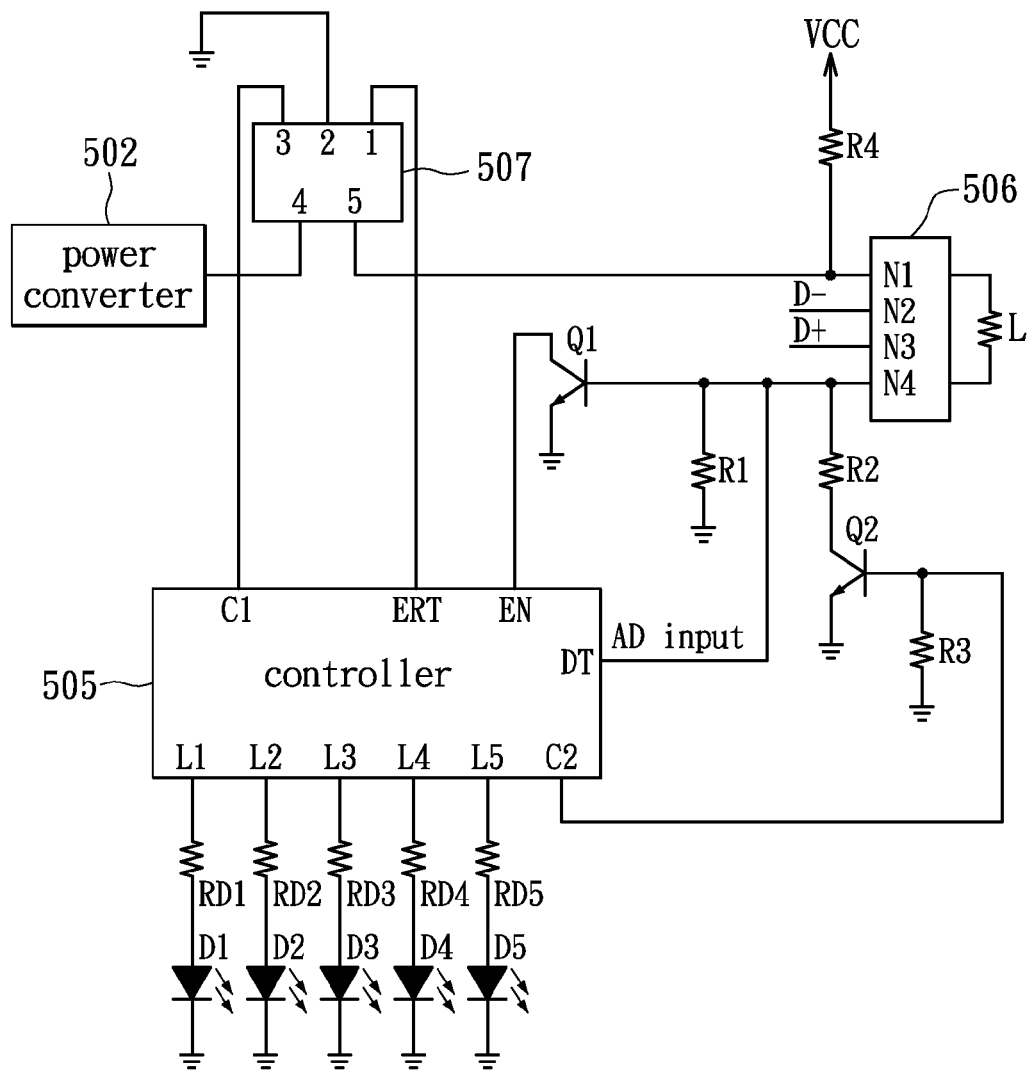
FIG. 6 shows a circuit block diagram of a circuit protection apparatus according to a fifth embodiment of the disclosure.

FIG. 6 shows a circuit block diagram of a circuit protection apparatus according to a fifth embodiment of the disclosure. Please refer to FIG. 6 and FIG. 5, in the fourth embodiment, the first switch and the second switch in FIG. 5 are respectively implemented with the first MOSFET M1 and the second MOSFET M2. However, in the fifth embodiment, the first switch and the second switch are respectively implemented with a first bipolar transistor Q1 and a second bipolar transistor Q2. It's worth noting that, because the first bipolar transistor Q1 and the second bipolar transistor Q2 are current driving components, thus more attention must be paid to the numeral design of the first impedance component R1 and the fourth impedance component R4. Because, in addition to that the conducting voltage of the bipolar transistors Q1 is 0.7V, the values of currents also need to be considered.

In addition to the considered points above, the one skilled in the art should know that portion of the operations in the fifth embodiment is equivalent to the counterpart in the third embodiment. Thus the one skilled in the art can easily derive the operations in the fifth embodiment by referring to the third embodiment and the considered points above. Therefore, the operations are not repeatedly described.

Sixth Embodiment

Figure 7:
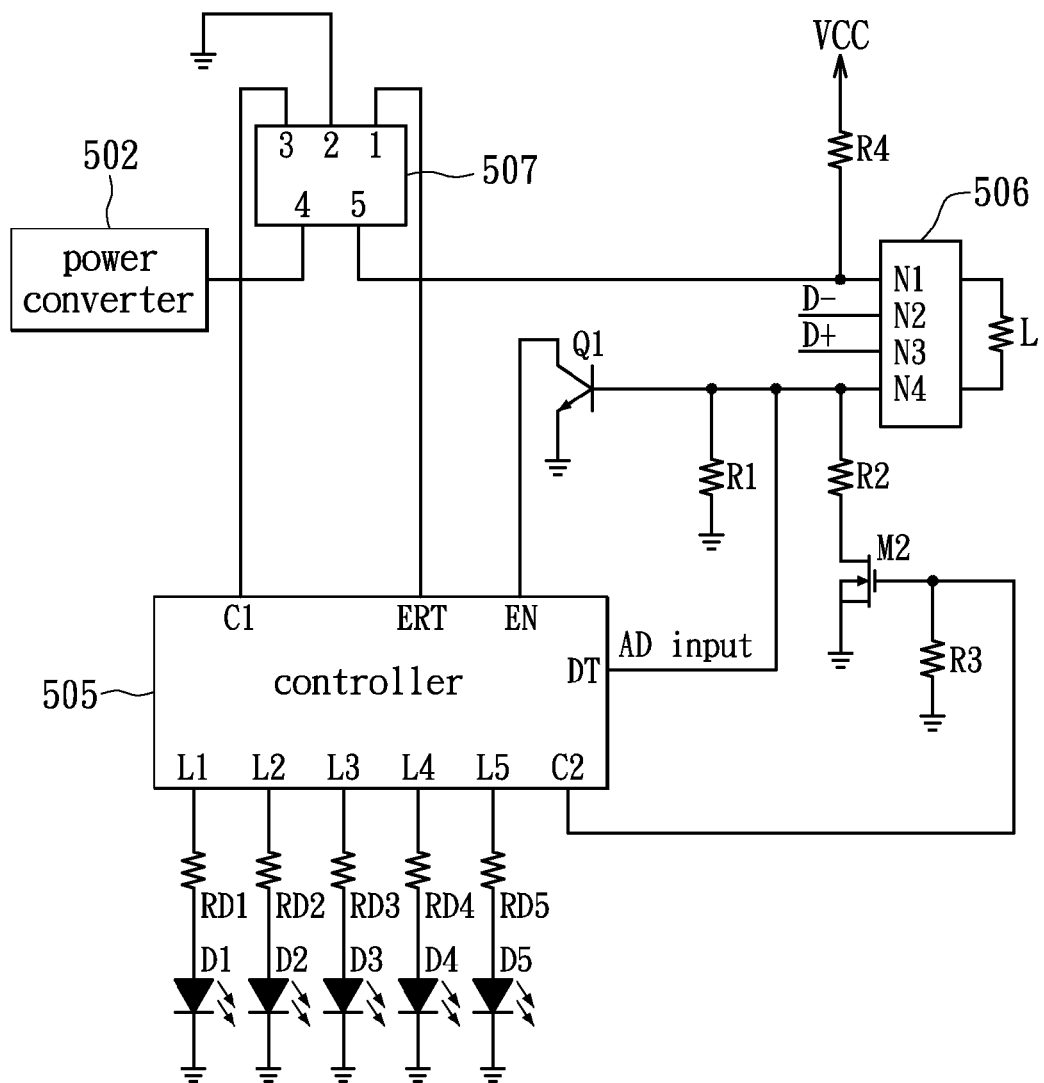
FIG. 7 shows a circuit block diagram of a circuit protection apparatus according to a sixth embodiment of the disclosure.

FIG. 7 shows a circuit block diagram of a circuit protection apparatus according to a sixth embodiment of the disclosure. Please refer to FIG. 7 along with FIG. 5 and FIG. 6. By comparing FIG. 7 with FIG. 5 and FIG. 6, the one skilled in the art can see that in FIG. 7, the first switch is implemented with the bipolar transistor Q1, and the second switch is implemented by the MOSFET M2. Because the operations are described in the third embodiment and the considered points and the selections of the resistance values are described in the fourth embodiment, the one skilled in the art may be able to change the implementations of the first and second switches between the bipolar transistors and the MOSFETs. Similarly, the one skilled in the art may also be able to implement the first switch with MOSFET while the second switch with the bipolar transistor.

Seventh Embodiment

Figure 8:
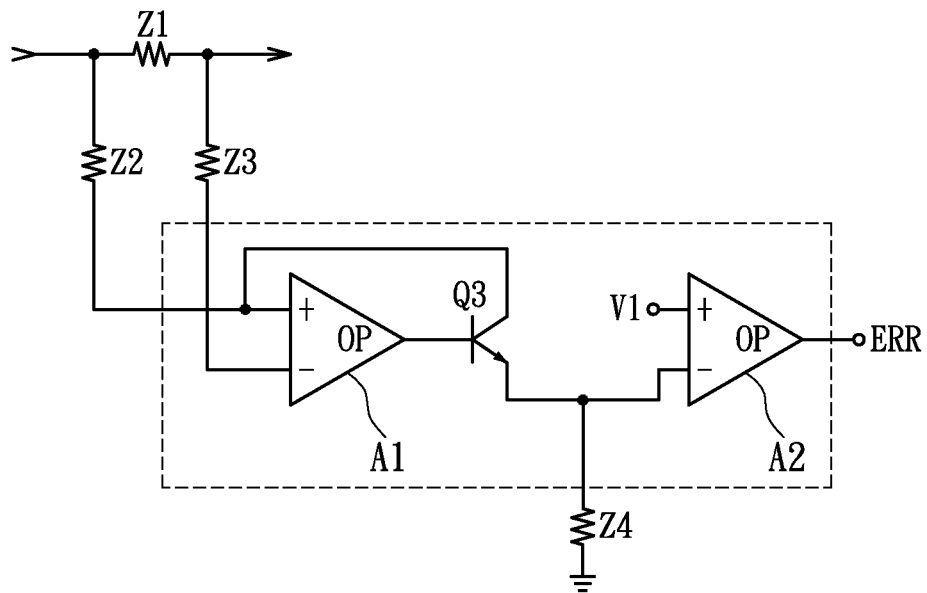
FIG. 8 shows a circuit diagram of an output circuit for outputting error flags logical voltage within a circuit protection apparatus according to a seventh embodiment of the disclosure.

FIG. 8 shows a circuit diagram of the output circuit for outputting an error flag logical voltage within a circuit protection apparatus according to a seventh embodiment of the disclosure. Please refer to FIG. 8, in order to let the one skilled in the art more understand, the disclosure provides a mechanism for outputting the error flag logical voltage ERR. The circuit for outputting the error flag logical voltage includes a first resistor Z1, a second resistor Z2, a third resistor Z3, a fourth resistor Z4, a first amplifier A1, a second amplifier A2, and a third bipolar transistor Q3. The coupling relations thereof are shown in FIG. 8. When a short-circuit situation occurs, the current flowing through the first resistor Z1 is too large and makes the voltage drop between the fourth resistor Z4 exceed the reference voltage 1.25V, thus the second amplifier A2 outputs the error flags logical voltage ERR.

Eighth Embodiment

Figure 9:
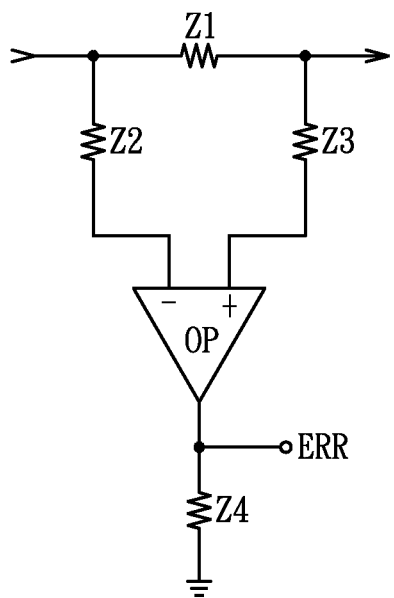
FIG. 9 shows a circuit diagram of an output circuit for outputting error flags logical voltage within a circuit protection apparatus according to an eighth embodiment of the disclosure.

FIG. 9 shows a circuit diagram of the output circuit for outputting an error flag logical voltage within a circuit protection apparatus according to an eighth embodiment of the disclosure. Please refer to FIG. 9, in order to let the one skilled in the art more understand, the disclosure provides a mechanism for outputting the error flag logical voltage ERR. The circuit for outputting the error flag logical voltage includes a first resistor Z1, a second resistor Z2, a third resistor Z3, a fourth resistor Z4, and a first amplifier A1, and the coupling relations thereof are shown in FIG. 9. Similarly, when a short-circuit situation occurs, the current flowing through the first resistor Z1 is too large, and the voltages at the two terminals of the first amplifier A1 are different, thus the first amplifier A1 will output the error flag logical voltage ERR.

Ninth Embodiment

Figure 10:
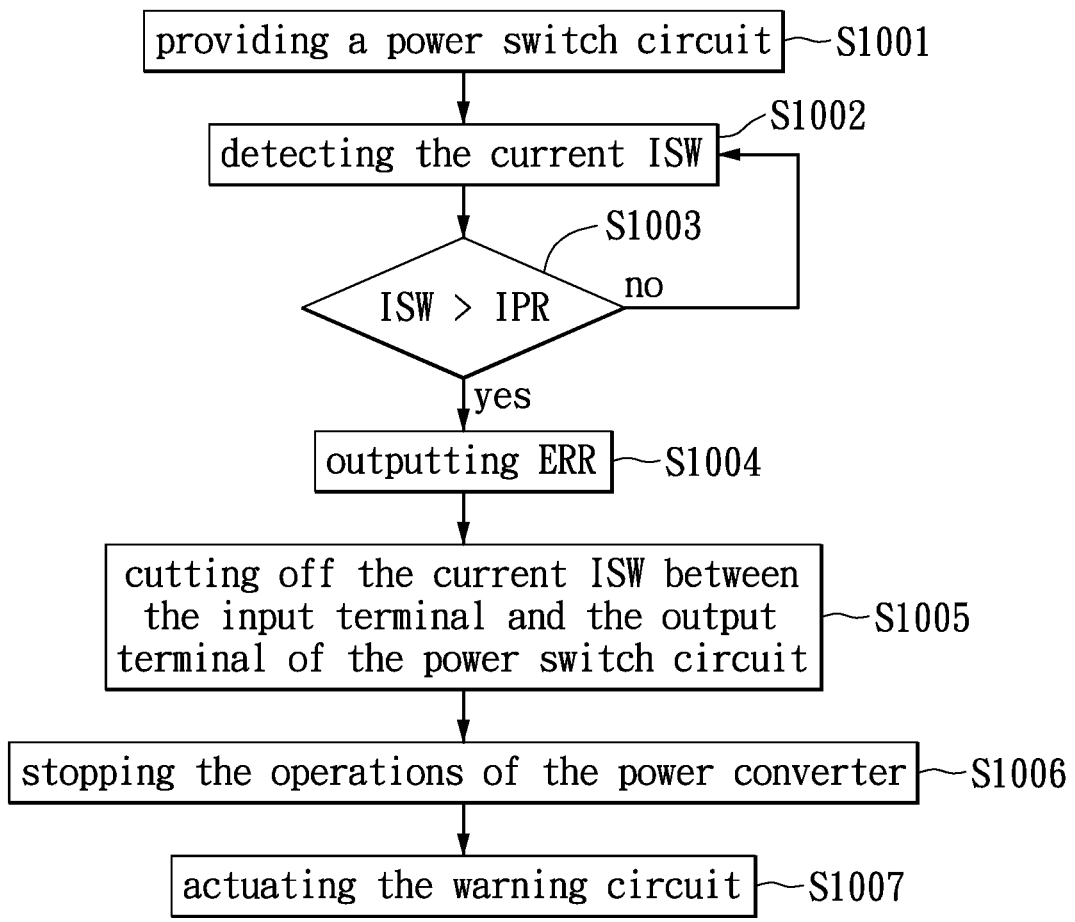
FIG. 10 shows a flow chart of a short circuit warning protection method according to the eighth embodiment of the disclosure.

From the aforementioned embodiments, a method for short-circuit warning protection can be derived. FIG. 10 shows a flow chart for short-circuit warning protection method according to a ninth embodiment of the disclosure. Please refer to FIG. 10, the method includes the following steps:

Step S1001: providing a power switch circuit between the first power node and the power converter.

Step S1002: detecting the value of the current ISW between the input terminal and the output terminal of the power switch circuit.

Step S1003: determining whether the current ISW between the input terminal and the output terminal of the power switch circuit is larger than a predetermined current IPR or not. If the current ISW is not larger than the current IPR, the method then goes back to the step S1002 and continues execution. If the current ISW is larger than the current IPR, the step S1004 is then executed.

Step S1004: when the current ISW between the input terminal and the output terminal of the power switch circuit is larger than the predetermined current IPR, the power switch circuit will output an error flag logical voltage ERR.

Step S1005: when the controller receives the error flag logical voltage ERR, the current ISW between the input terminal and the output terminal of the power switch circuit is cut off.

Step S1006: stopping the operations of the power converter.

Step S1007: actuating the warning circuit for noticing the users.

On the basis of the above, in the disclosure the controller is enabled and output a control signal by turning on the first switch, so as to driving the power converter to output electric power. The controller controls the second switch to turn on, and continuously detects the voltage of the second power node by using the detection terminal. In addition, in the disclosure a power switch circuit is added between the power converter and the power node of the peripheral interface, and the power switch circuit has the function of detecting a voltage or a current or both. When the current or voltage is abnormal, a warning signal is outputted for noticing a microprocessor, and the microprocessor may be able to turn off the power converter, and may immediately turn on the connected warning components, so as to let the user know that the plugged peripheral devices are abnormal. When the situations are solved, the controller in this disclosure can further enter immediately into the power saving mode for lengthening the usage lifetime of the products.

On reading or having read this description or having comprehended these examples, some modifications of these examples, as well as other possibilities will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A circuit protection apparatus, for controlling a peripheral interface, wherein the peripheral interface includes a first power node and a second power node, and the circuit protection apparatus comprises:
   an auxiliary power supply circuit, including a first terminal and a second terminal, wherein the first terminal of the auxiliary power supply circuit is coupled to a power voltage, and the second terminal of the auxiliary power supply circuit is coupled to the first power node;
   a power converter, including an input terminal and an output terminal, wherein the output terminal of the power converter is coupled to the second terminal of the auxiliary power supply circuit, and the input terminal of the power converter receives a control signal for adjusting a voltage of the output terminal of the power converter according to the control signal;
   a first switch, including a first terminal, a second terminal, and a control terminal, wherein the second terminal of the first switch is coupled to a common voltage, and the control terminal of the first switch is coupled to the second power node;
   a second switch, including a first terminal, a second terminal, and a control terminal, wherein the second terminal of the second switch is coupled to the common voltage, and the first terminal of the second switch is coupled to the second power node; and
   a controller, including a first control terminal, a second control terminal, an enable terminal, and a detection terminal, wherein the first control terminal of the controller is coupled to the input terminal of the power converter, the second control terminal of the controller is coupled to the control terminal of the second switch, the enable terminal of the controller is coupled to the first terminal of the first switch, and the detection terminal of the controller is coupled to the second power node;
   wherein when a load is plugged to the peripheral interface and makes the first power node and the second power node be electrically connected with each other through the load, the second terminal of the auxiliary power supply circuit provides the power voltage to the control terminal of the first switch through the load, so that the first switch turns on and the enable terminal of the controller receives the common voltage;
   wherein after the enable terminal of the controller receives the common voltage, the controller is enabled, the first control terminal of the controller outputs the control signal for driving the output terminal of the power converter to output a power, the controller controls the second switch to turn on by using the second control terminal of the controller, and the controller continuously detects a voltage of the second power node by using the detection terminal;
   wherein when the controller detects that the voltage of the second power node is lower than a predetermined voltage, the first control terminal of the controller stops outputting the control signal, and the controller enters into a power saving mode.

2. The circuit protection apparatus according to claim 1, further comprising:
   a power switch circuit, including an input terminal, an output terminal, a warning terminal, and an enable terminal, wherein the input terminal of the power switch circuit is coupled to the output terminal of the power converter, and the output terminal of the power switch circuit is coupled to the first power node;
   a warning circuit, coupled to the common voltage;
   wherein the controller further includes at least one warning control terminal, an enable control terminal, and an abnormity warning terminal, wherein the at least one warning control terminal of the controller is coupled to the warning circuit, the enable control terminal of the controller is coupled to the enable terminal of the power switch circuit, and the abnormity warning terminal of the controller is coupled to the warning terminal of the power switch circuit; and
   wherein when the load is plugged to the peripheral interface and makes the first power node and the second power node electrically connected with each other through the load, the controller controls the power converter for outputting a power voltage, and the enable control terminal of the controller outputs an enable signal, wherein when the enable terminal of the power switch circuit receives the enable signal, the input terminal of the power switch circuit and the output terminal of the power switch circuit are conductive;
   wherein when the load is too large and makes the first power node and the second power node short-circuited, thus makes currents of the input terminal and the output terminal of the power switch circuit larger than a predetermined current, the warning terminal of the power switch circuit outputs an error flag logical voltage; when the abnormity warning terminal of the controller receives the error flag logical voltage, the controller turns off the power converter through the first control terminal, and the controller turns off the power switch circuit through the enable control terminal, so as to cut off the input terminal and the output terminal of the power switch circuit, and the controller turns on the warning circuit through the at least one warning control terminal for warning users.

3. The circuit protection apparatus according to claim 2, wherein when the abnormity warning terminal of the controller receives the error flag logical voltage, the controller turns off the second switch through the second control terminal, and the controller makes the warning circuit work by using the at least one warning control terminal for warning the users; and wherein when the load is removed and the detection terminal of the controller detects that the voltage is lower than the predetermined voltage, the controller enters a standby mode, controls the second switch to turn off through the second control terminal of the controller, and the enable control terminal of the controller outputs the enable signal for making the input terminal of the power switch circuit and the output terminal of the power switch circuit short-circuited.

4. The circuit protection apparatus according to claim 1, further comprising:

a first impedance component, including a first terminal and a second terminal, wherein the first terminal of the first impedance component is coupled to the second power node, and the second terminal of the first impedance component is coupled to the common voltage.

5. The circuit protection apparatus according to claim 1, further comprising:

a second impedance component, including a first terminal and a second terminal, wherein the first terminal of the second impedance component is coupled to the second power node, and the second terminal of the second impedance component is coupled to the first terminal of the second switch.

6. The circuit protection apparatus according to claim 1, further comprising:

a third impedance component, including a first terminal and a second terminal, wherein the first terminal of the third impedance component is coupled to the control terminal of the second switch, and the second terminal of the third impedance component is coupled to the common voltage.

7. The circuit protection apparatus according to claim 1, wherein the first switch further includes:

a first metal-oxide semiconductor field-effect transistor, including a gate node, a first node, and a second node, wherein the gate node of the first metal-oxide semiconductor field-effect transistor is coupled to the control terminal of the first switch, the first node of the first metal-oxide semiconductor field-effect transistor is coupled to the first terminal of the first switch, and the second node of the first metal-oxide semiconductor field-effect transistor is coupled to the second terminal of the first switch.

8. The circuit protection apparatus according to claim 1, wherein the first switch further includes:

a first bipolar transistor, including a base node, a collector node, and an emitter node, wherein the base node of the first bipolar transistor is coupled to the control terminal of the first switch, the collector node of the first bipolar transistor is coupled to the first terminal of the first switch, and the emitter node of the first bipolar transistor is coupled to the second terminal of the first switch.

9. The circuit protection apparatus according to claim 1, wherein the second switch further includes:

a second metal-oxide semiconductor field-effect transistor, including a gate node, a first node, and a second node, wherein the gate node of the second metal-oxide semiconductor field-effect transistor is coupled to the control terminal of the second switch, the first node of the second metal-oxide semiconductor field-effect transistor is coupled to the first terminal of the second switch, and the second node of the second metal-oxide semiconductor field-effect transistor is coupled to the second terminal of the second switch.

10. The circuit protection apparatus according to claim 1, wherein the second switch further includes:

a second bipolar transistor, including a base node, a collector node, and an emitter node, wherein the base node of the second bipolar transistor is coupled to the control terminal of the second switch, the collector node of the second bipolar transistor is coupled to the first terminal of the second switch, and the emitter node of the second bipolar transistor is coupled to the second terminal of the second switch.

11. The circuit protection apparatus according to claim 1, wherein the auxiliary power supply circuit further includes:

a fourth impedance component, including a first terminal and a second terminal, wherein the first terminal of the fourth impedance component is coupled to the first terminal of the auxiliary power supply circuit, and the second terminal of the fourth impedance component is coupled to the second terminal of the auxiliary power supply circuit.

12. The circuit protection apparatus according to claim 2, wherein the warning circuit includes at least one light emitting diode, for emitting lights to warn the users.

13. The circuit protection apparatus according to claim 2, wherein the warning circuit includes at lease one speaker, for generating sounds to warn the users.

14. The circuit protection apparatus according to claim 12, wherein the warning circuit includes at least one speaker, for generating sounds to warn the users.

15. The circuit protection apparatus according to claim 2, wherein the power switch circuit further includes:

a first resistor, including a first terminal and a second terminal, wherein the first terminal of the first resistor is coupled to the input terminal of the power switch circuit, and the second terminal of the first resistor is coupled to the output terminal of the power switch circuit;

a second resistor, including a first terminal and a second terminal, wherein the first terminal of the second resistor is coupled to the input terminal of the power switch circuit;

a third resistor, including a first terminal and a second terminal, wherein the second terminal of the third resistor is coupled to the output terminal of the power switch circuit;

a first amplifier, including a non-inverting input terminal, an inverting input terminal, and an output terminal, wherein the non-inverting input terminal of the first amplifier is coupled to the second terminal of the second resistor, and the inverting input terminal of the first amplifier is coupled to the second terminal of the third resistor;

a third bipolar transistor, including a base node, a collector node, and an emitter node, wherein the base node of the third bipolar transistor is coupled to the output terminal of the first amplifier, and the collector node of the third bipolar transistor is coupled to the non-inverting input terminal of the first amplifier;

a fourth resistor, including a first terminal and a second terminal, wherein the first terminal of the fourth resistor is coupled to the emitter node of the third bipolar transistor, and the second terminal of the fourth resistor is coupled to the common voltage; and a second amplifier, including a non-inverting input terminal, an inverting input terminal, and an output terminal, wherein the non-inverting input terminal of the second amplifier is coupled to a reference voltage, the inverting input terminal of the second amplifier is coupled to the first terminal of the fourth resistor, and the output terminal of the second amplifier outputs the error flag logical voltage.

16. The circuit protection apparatus according to claim 2, wherein the power switching circuit further includes:

a first resistor, including a first terminal and a second terminal, wherein the first terminal of the first resistor is coupled to the input terminal of the power switch circuit, and the second terminal of the first resistor is coupled to the output terminal of the power switch circuit;

a second resistor, including a first terminal and a second terminal, wherein the first terminal of the second resistor is coupled to the input terminal of the power switch circuit;

a third resistor, including a first terminal and a second terminal, wherein the second terminal of the third resistor is coupled to the output terminal of the power switch circuit;

a first amplifier, including a non-inverting input terminal, an inverting input terminal, and an output terminal, wherein the non-inverting input terminal of the first amplifier is coupled to the second terminal of the second resistor, the inverting input terminal of the first amplifier is coupled to the second terminal of the third resistor, and the output terminal of the first amplifier outputs the error flag logical voltage; and a fourth resistor, including a first terminal and a second terminal, wherein the first terminal of the fourth resistor is coupled to the output terminal of the first amplifier, and the second terminal of the fourth resistor is coupled to the common voltage.

\* \* \* \* \*